United States Patent
Kim et al.

(10) Patent No.: US 9,923,686 B2
(45) Date of Patent: Mar. 20, 2018

(54) METHOD AND APPARATUS OF TRANSMITTING SOUNDING REFERENCE SIGNAL IN MULTIPLE ANTENNA SYSTEM

(75) Inventors: Hak Seong Kim, Anyang-si (KR); Bong Hoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 13/141,797

(22) PCT Filed: Jan. 13, 2010

(86) PCT No.: PCT/KR2010/000205
§ 371 (c)(1),
(2), (4) Date: Jun. 23, 2011

(87) PCT Pub. No.: WO2010/082756
PCT Pub. Date: Jul. 22, 2010

(65) Prior Publication Data
US 2011/0261716 A1    Oct. 27, 2011

Related U.S. Application Data

(60) Provisional application No. 61/144,431, filed on Jan. 13, 2009.

(30) Foreign Application Priority Data

Aug. 18, 2009    (KR) .................. 10-2009-0076018

(51) Int. Cl.
*H04L 5/00*    (2006.01)
*H04B 7/06*    (2006.01)
*H04L 25/02*    (2006.01)

(52) U.S. Cl.
CPC ......... *H04L 5/0048* (2013.01); *H04B 7/0671* (2013.01); *H04L 5/0026* (2013.01);
(Continued)

(58) Field of Classification Search
CPC ............ H04W 72/1289; H04W 72/042; H04L 5/0051; H04L 5/0007; H04L 5/0023; H04L 5/0053
(Continued)

(56) References Cited

U.S. PATENT DOCUMENTS 6,590,889 B1 * 7/2003 Preuss .................. H04B 7/1858
370/321
7,778,151 B2 * 8/2010 Bertrand et al. .............. 370/208
(Continued)

FOREIGN PATENT DOCUMENTS

CN    1773981 A    5/2006
EP    1657872 A2    5/2006
(Continued)

OTHER PUBLICATIONS

Nokia Siemens Networks, Nokia, "Cyclic Shift Hopping and DM RS Signaling", 3GPP TSG-RAN WG1 Meeting #50bis, Shanghai, China Oct. 8-12, 2007, R1-074315.*
(Continued)

*Primary Examiner* — Joseph Bednash
(74) *Attorney, Agent, or Firm* — Birch, Stewart, Kolasch & Birch, LLP

(57) ABSTRACT

A method and an apparatus of transmitting a sounding reference signal by a user equipment is provided. A user equipment transmits a first sounding reference signal through a first antenna, and transmits a second sounding reference signal through a second antenna. Resources for transmitting the first sounding reference signal and the second sounding reference signal are partially different.

20 Claims, 6 Drawing Sheets

(52) U.S. Cl.
CPC ........ *H04L 5/0028* (2013.01); *H04L 25/0226* (2013.01); *H04L 5/0082* (2013.01); *H04L 5/0092* (2013.01)

(58) Field of Classification Search
USPC ....... 370/252, 328, 329, 319, 330, 334, 337, 370/478, 491
See application file for complete search history.

(56) References Cited

U.S. PATENT DOCUMENTS

| | | | |
|---|---|---|---|
| 8,005,153 B2* | 8/2011 | Muharemovic et al. | 375/259 |
| 8,086,272 B2* | 12/2011 | Teo et al. | 455/562.1 |
| 8,565,168 B2* | 10/2013 | Papasakellariou et al. | 370/329 |
| 2005/0041750 A1 | 2/2005 | Lau | |
| 2007/0171995 A1 | 7/2007 | Muharemovic et al. | |
| 2008/0080472 A1 | 4/2008 | Bertrand et al. | |
| 2008/0232325 A1 | 9/2008 | Mehta et al. | |
| 2008/0318608 A1* | 12/2008 | Inoue et al. | 455/509 |
| 2009/0181687 A1* | 7/2009 | Tiirola et al. | 455/450 |
| 2010/0002647 A1 | 1/2010 | Ahn et al. | |
| 2011/0200143 A1* | 8/2011 | Koo et al. | 375/299 |

FOREIGN PATENT DOCUMENTS

| | | |
|---|---|---|
| JP | 2008-193648 A | 8/2008 |
| KR | 10-2008-0085653 A | 9/2008 |
| KR | 10-2008-0088525 A | 10/2008 |
| WO | WO 2007/109679 A2 | 9/2007 |
| WO | WO 2008/116027 A2 | 9/2008 |
| WO | WO 2008/126655 A2 | 10/2008 |
| WO | WO 2008/132597 A2 | 11/2008 |

OTHER PUBLICATIONS

3GPP TSG-RAN1 Meeting #53 bis; #R1-082755; Draft Change Request; 36.211 CR; Current Version 8.3.0. Jul. 2008.

Ericsson, "The need for SoundingRsUl-ConfigCommon", RAN WG2 Meeting #64, R2-086407, Prague, Czech Republic, Nov. 10-14, 2008, 5 pages.

LG Electronics, "Uplink MIMO Transmission for LTE-Advanced", 3GPP TSG RAN WG1 Meeting #54, R1-082943, Jeju, South Korea, Aug. 18-22, 2008, pp. 1-5.

Motorola, "UL Sounding RS—Open Issues", 3GPP TSG RAN WG1 #51bis, R1-080066, Sevilla, Spain, Jan. 14-18, 2008, pp. 1-7.

Motorola, "UL Sounding RS Remaining Issues", 3GPP TSG RAN1 #53, R1-081925, Kansas City, MO, USA, May 5-9, 2008, 4 pages.

Samsung, "Summary of Reflector Discussions on EUTRA UL RS", 3GPP TSG RAN WG1 #51bis, R1-080020, Sevilla, Spain, Jan. 14-18, 2008, pp. 1-4.

Huawei, "Performances of transmit diversity for PUSCH," 3GPP TSG RAN WG1#55bis, R1-090131, Ljubljana, Slovenia, Jan. 12-16, 2009, 9 pages.

Nokia Siemens Networks et al., "Cyclic Shift Hopping and DM RS Signaling," 3GPP TSG RAN WG1 Meeting #49, R1-072294, Kobe, Japan, May 7-11, 2007, 4 pages, XP002494363.

Nokia, "UL Reference Signals," 3GPP TSG RAN WG1 Meeting #47bis, R1-070384, Sorrento, Italy, Jan. 15-19, 2007, 3 pages, XP050104416.

NTT DoCoMo et al., "RS and Signaling Structure Considering Future Support of SU-MIMO in E-UTRA Uplink," 3GPP TSG RAN WG1 Meeting #48bis, R1-071646, St. Julians, Malta, Mar. 26-30, 2007, pp. 1-2, XP050105572.

Samsung, "SRS Transmission Issues for LTE-A," 3GPP TSG RAN WG1 #55bis, R1-090100, Ljubljana, Slovenia, Jan. 14-18, 2009, pp. 1-3, XP50318042A.

Texas Instruments, "Summary of Reflector Discussions on EUTRA UL RS," 3GPP TSG RAN WG1#48 bis, R1-071483, St. Julian, Malta, Mar. 26-30, 2007, pp. 1-3, XP50596349A.

3GPP, "Technical Specification Group Radio Access Network; Evolved Universal Terrestrial Radio Access (E-UTRA); Physical Channels and Modulation," Release 8, 3GPP TS 36.211, V8.5.0, Dec. 18, 2008, pp. 1-82.

* cited by examiner

[Fig. 1]
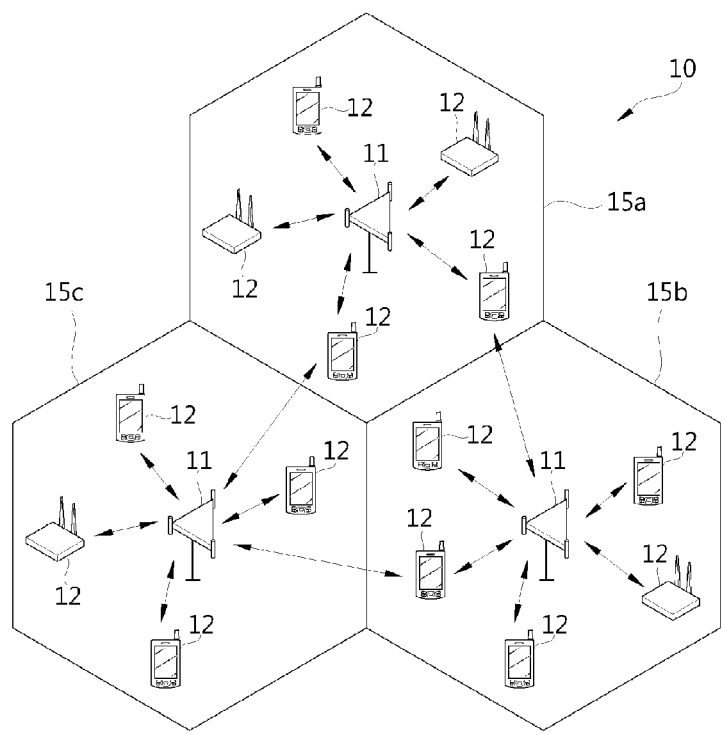
[Fig. 2]
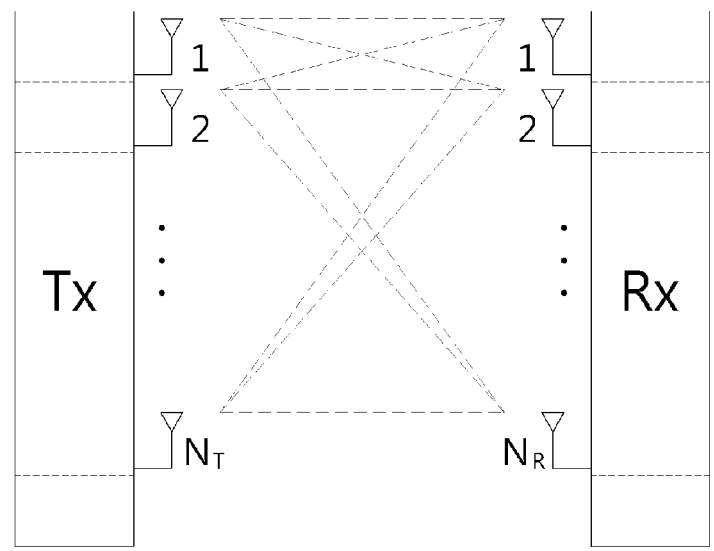
[Fig. 3]
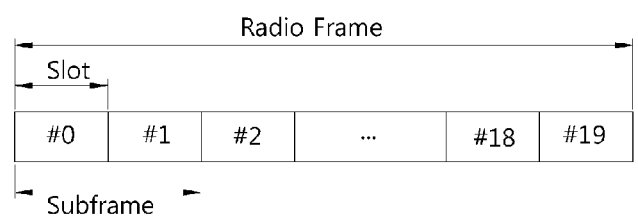

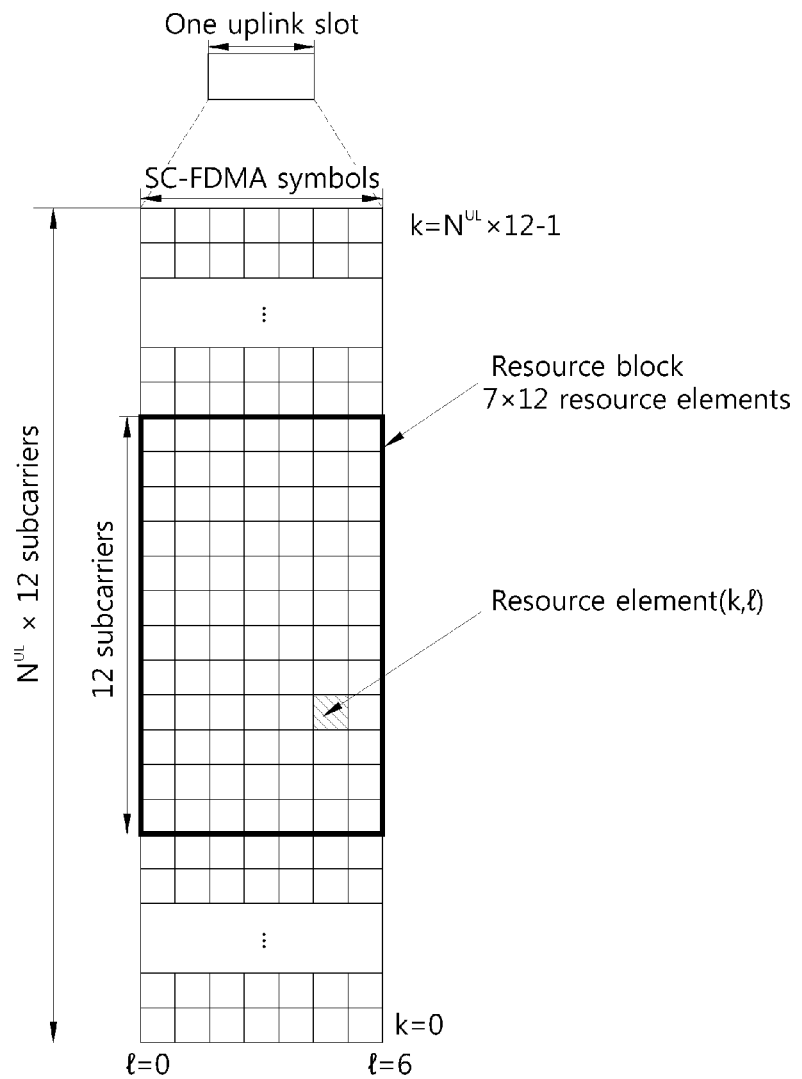
[Fig. 4]

[Fig. 5]
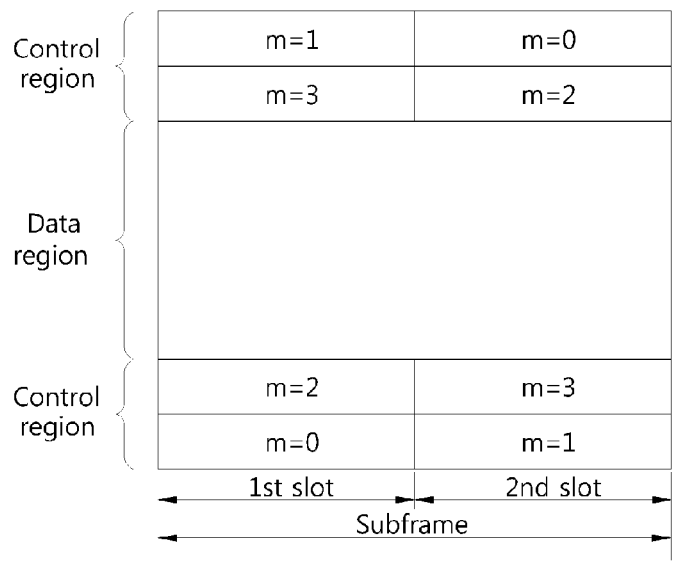
[Fig. 6]
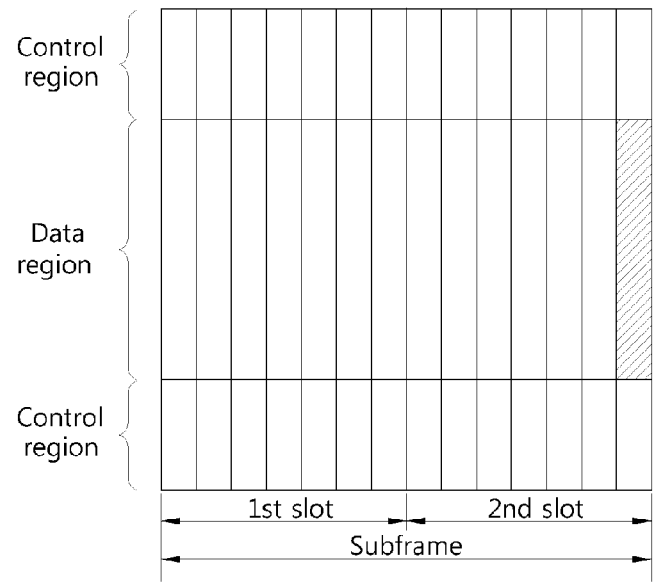

[Fig. 7]
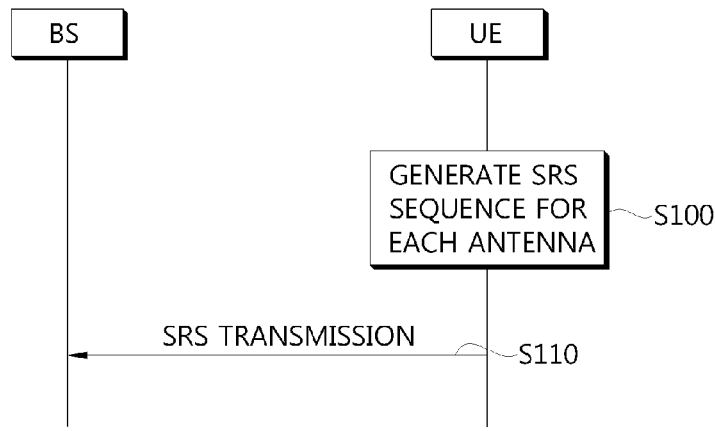
[Fig. 8]
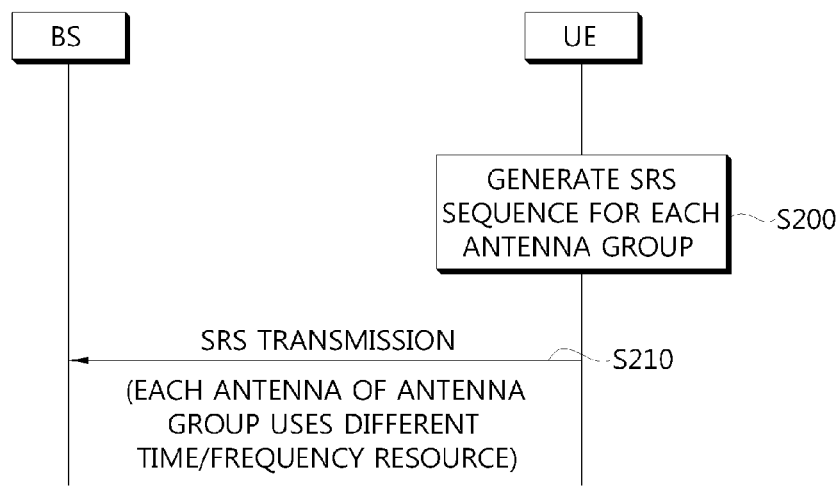
[Fig. 9]
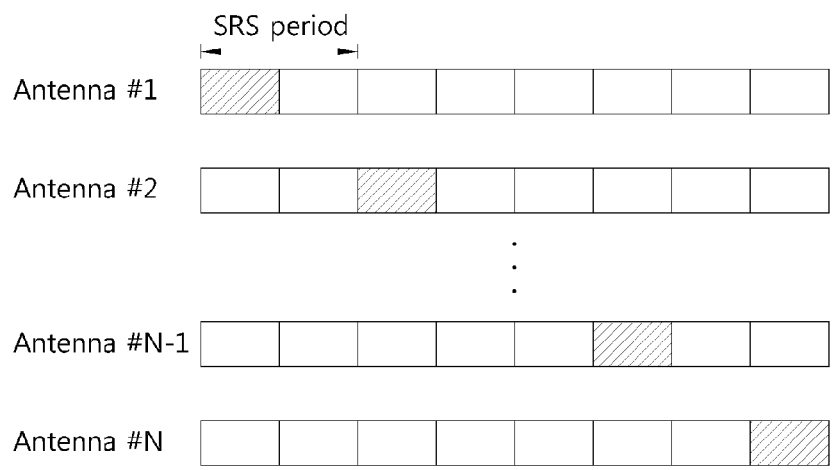

[Fig. 10]
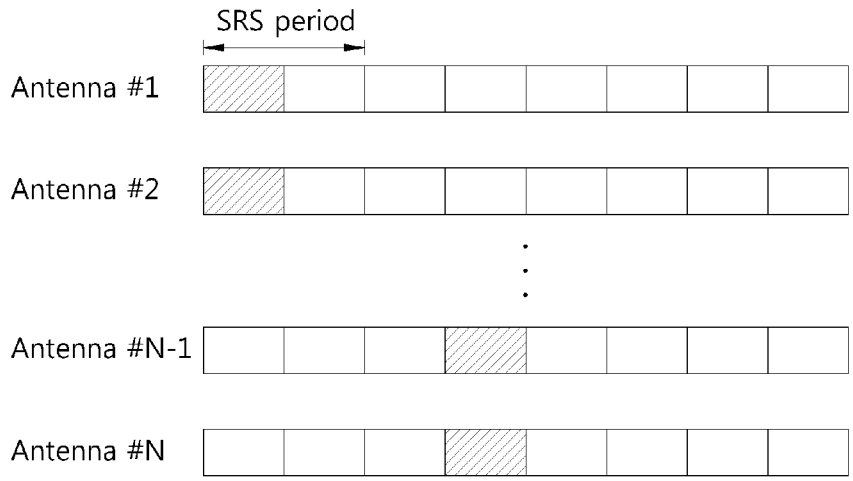
[Fig. 11]
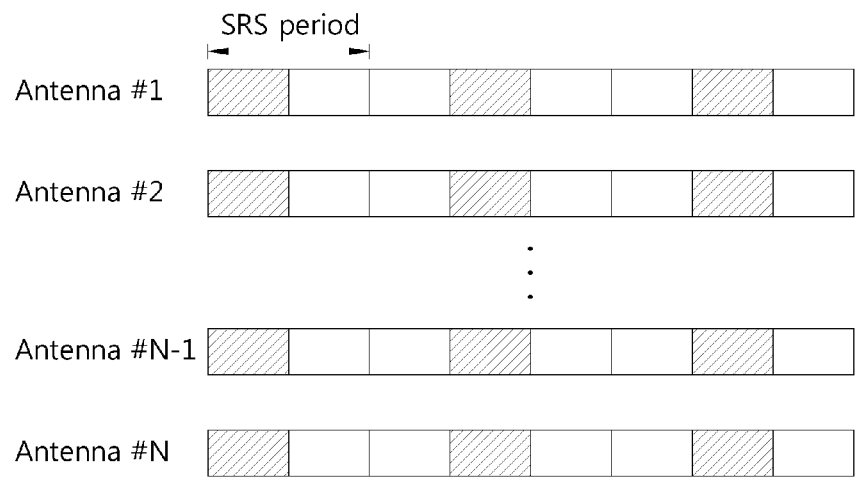
[Fig. 12]
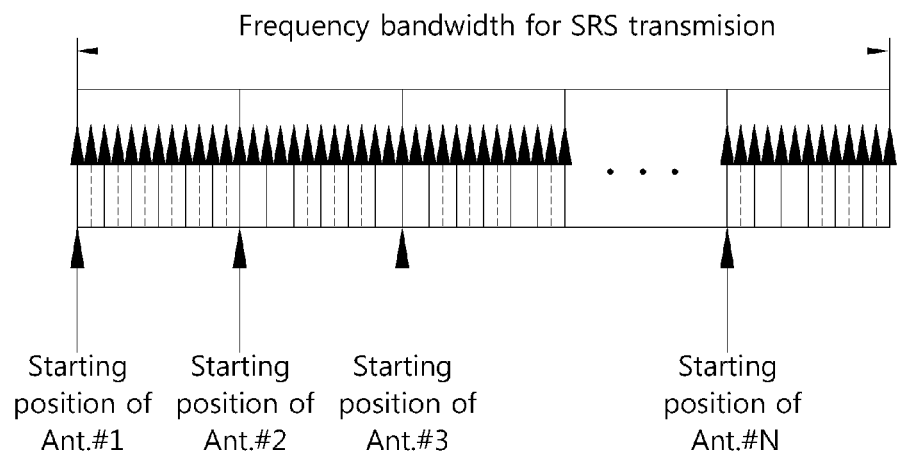

[Fig. 13]
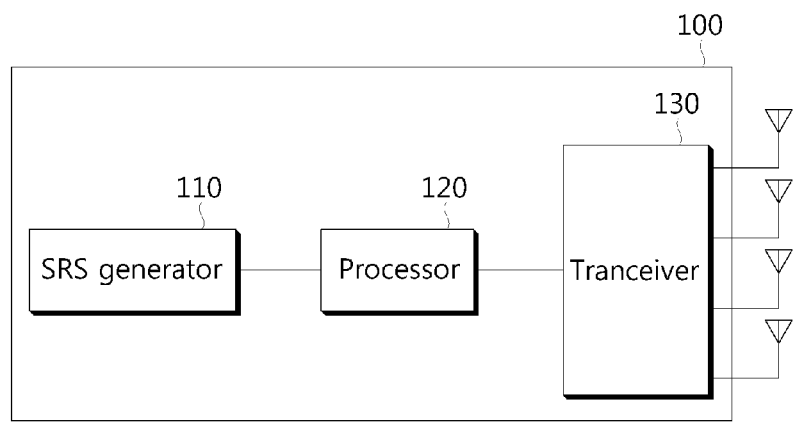
[Fig. 14]
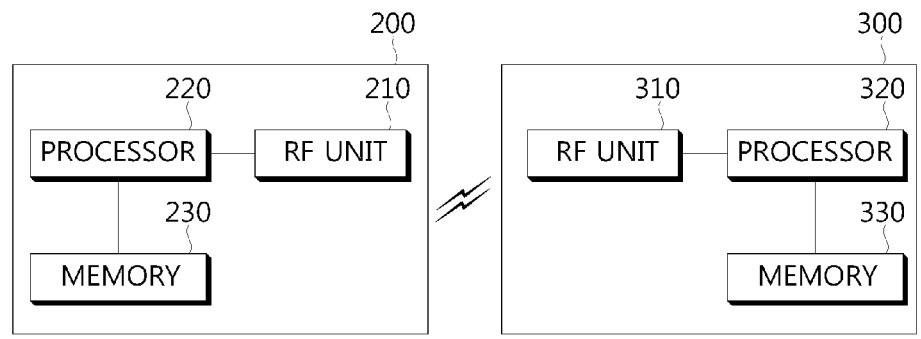

METHOD AND APPARATUS OF TRANSMITTING SOUNDING REFERENCE SIGNAL IN MULTIPLE ANTENNA SYSTEM

This application is the National Phase of PCT/KR2010/000205 filed on Jan. 13, 2010, which claims the benefit under 35 U.S.C. 119(e) of U.S. Provisional Application No. 61/144,431 filed on Jan. 13, 2009, and claims priority under 35 U.S.C. 119 (a) to Patent Application No. 10-2009-0076018 filed in Republic of Korea on Aug. 18, 2009, all of which are hereby expressly incorporated by reference into the present application.

TECHNICAL FIELD

The present invention relates to wireless communications, and more particularly, to a method and apparatus of transmitting a sounding reference signal in a wireless communication system.

BACKGROUND ART

Next generation wireless communication systems are expected to be able to transmit multimedia data of high quality at a high speed by using limited radio resources. To achieve this in a wireless channel having a limited bandwidth, inter-symbol interference and frequency selective fading, which occur during high-speed transmission, have to be overcome while maximizing spectral efficiency.

In general, a wireless communication system is a multiple access system capable of supporting communication with multiple users by sharing available radio resources. Examples of the radio resources include time, frequency, code/sequence, transmit (Tx) power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, a multi carrier frequency division multiple access (MC-FDMA) system, etc. The radio resource is time in the TDMA system, frequency in the FDMA system, code in the CDMA system, and subcarriers and time in the OFDMA system.

The SC-FDMA has almost the same complexity as the OFDMA, and has a lower peak-to-average power ratio (PAPR) due to a single carrier property. Since it is advantageous for a user equipment (UE) to have a low PAPR in terms of Tx power efficiency, the SC-FDMA is adopted for uplink transmission in a 3rd generation partnership project (3GPP) long term evolution (LTE) as disclosed in section 5 of the 3GPP TS 36.211 V8.2.0 (2008 March) "Technical Specification Group Radio Access Network; Evolved Universal Terrestrial Radio Access (E-UTRA); Physical channels and modulation (Release 8)".

A closed-loop transmission scheme using a channel condition between a base station (BS) and a UE is introduced to improve capability of the wireless communication system. An adaptive modulation and coding (AMC) scheme is a technique in which the BS regulates a modulation and coding scheme (MCS) by using feedback channel state information to increase link capability.

The UE reports a well-known control signal such as a channel quality indicator (CQI) to the BS, and thus the BS can know a downlink channel state. The BS may perform frequency selective scheduling by receiving the downlink channel state from each UE. If the frequency selective scheduling is also performed in uplink, the BS needs to know an uplink channel state.

An uplink channel state is measured by using a reference signal. The reference signal is known both to the BS and the UE, and is also referred to as a pilot. The reference signal is classified into two types, i.e., a demodulation reference signal and a sounding reference signal (SRS). The demodulation reference signal is used in channel estimation for data demodulation. The SRS is used in uplink scheduling. When the UE transmits the SRS to the BS, the BS estimates an uplink channel by using the received SRS. The estimated uplink channel is used in uplink scheduling.

Meanwhile, a multiple antenna system is a communication system using a plurality of transmit (Tx)/receive (Rx) antennas. The multiple antenna system can linearly increase a channel capacity without additional increase of a frequency bandwidth as the number of Tx/Rx antennas increases. In a case where communication is achieved using the multiple antenna system, it is not effective to directly use the conventional communication method using a single antenna. Accordingly, there is a need for a method to be used when a UE intends to transmit an SRS by using multiple antennas.

DISCLOSURE OF INVENTION

Technical Problem

The present invention provides a method and apparatus of transmitting a sounding reference signal by a user equipment through multiple antennas in a wireless communication system.

Solution to Problem

In an aspect, a method of transmitting a sounding reference signal by a user equipment is provided. The method include transmitting a first sounding reference signal through a first antenna, and transmitting a second sounding reference signal through a second antenna, wherein resources for transmitting the first sounding reference signal and the second sounding reference signal are partially different. At least one of a sequence resource, a time resource, and a frequency resource may be different among the resources for transmitting the first sounding reference signal and the second sounding reference signal. Different cyclic shifts may be applied to the first sounding reference signal and the second sounding reference signal. Different transmission combs may be applied to the first sounding reference signal and the second sounding reference signal. The first sounding reference signal and the second sounding reference signal may have different starting positions in a frequency domain allocated for transmission of the first sounding reference signal and the second sounding reference signal.

In another aspect, a method of transmitting a sounding reference signal by a user equipment is provided. The method include transmitting a first sounding reference signal through a first antenna, and transmitting a second sounding reference signal through a second antenna, wherein the first antenna and the second antenna are identified by a specific parameter applied to the first sounding reference signal and the second sounding reference signal. The specific parameter may be at least one of a cyclic shift value applied to a sounding reference signal, a time at which the sounding reference signal is transmitted, and a frequency at which the sounding reference signal is transmitted.

In another aspect a method of measuring an uplink channel state of a base station in a wireless communication system is provided. The method include transmitting a specific parameter for sounding reference signal transmission to a user equipment, receiving a plurality of sounding reference signals on the basis of the specific parameter from a plurality of antennas of the user equipment, and measuring the uplink channel state by using the plurality of sounding reference signals, wherein the plurality of antennas are identified by the specific parameter. The specific parameter may be at least one of a cyclic shift value applied to a sounding reference signal, a time at which the sounding reference signal is transmitted, and a frequency at which the sounding reference signal is transmitted.

In another aspect a user equipment in a wireless communication system is provided. The user equipment include a transceiver for transmitting and receiving a radio signal, and a processor coupled to the transceiver and configured to transmit a first sounding reference signal through a first antenna and transmit a second sounding reference signal through a second antenna, wherein resources for transmitting the first sounding reference signal and the second sounding reference signal are partially different.

Advantageous Effects of Invention

According to the present invention, a sounding reference signal can be transmitted by a user equipment through multiple antennas. Therefore, a radio resource can be effectively used.

BRIEF DESCRIPTION OF DRAWINGS

FIG. 1 shows a wireless communication system.

FIG. 2 shows a structure of a typical multiple antenna system.

FIG. 3 shows an exemplary structure of a radio frame in a 3rd generation partnership project (3GPP) long term evolution (LTE).

FIG. 4 shows an example of a resource grid for one uplink slot in a 3GPP LTE.

FIG. 5 shows an exemplary structure of an uplink subframe in a 3GPP LTE.

FIG. 6 shows an example of a subframe in which a sounding reference signal (SRS) is transmitted.

FIG. 7 is a flowchart showing a method of transmitting an SRS by a user equipment through multiple antennas according to an embodiment of the present invention.

FIG. 8 is a flowchart showing a method of transmitting an SRS by a user equipment through multiple antennas according to another embodiment of the present invention.

FIG. 9 shows a method of transmitting an SRS through a plurality of antenna according to an embodiment of the present invention.

FIG. 10 shows a method of transmitting an SRS through a plurality of antenna according to another embodiment of the present invention.

FIG. 11 shows a method of transmitting an SRS through a plurality of antenna according to another embodiment of the present invention.

FIG. 12 shows a method of mapping an SRS sequence to a frequency resource according to an embodiment of the present invention.

FIG. 13 is a block diagram showing an apparatus for wireless communication according to an embodiment of the present invention.

FIG. 14 is a block diagram showing an example of a base station and a user equipment.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

FIG. 2 shows a structure of a typical multiple antenna system.

Referring to FIG. 2, the number of transmit (Tx) antennas is $N_T$, and the number of receive (Rx) antennas is $N_R$.

Channel transmission capacity is theoretically increased in proportion to the number of antennas. Therefore, a data transfer rate can be improved and spectral efficiency can be remarkably improved. As the channel transmission capacity is increased, the data transfer rate can be theoretically increased by a value obtained by multiplying a rate increment rate $R_i$ by a maximum data transfer rate $R_o$ for a case of using a single antenna. The rate increment rate $R_i$ can be expressed as follows.

MathFigure 1

$$R_i = \min(N_T, N_R) \qquad [\text{Math.1}]$$

For example, a MIMO communication system using 4 Tx antennas and 4 Rx antennas can theoretically obtain a data transfer rate which is 4 times higher than that of a single antenna system.

A communication method of the multiple antenna system will be described in greater detail by using mathematical modeling. It is assumed that the system has $N_T$ Tx antennas and $N_R$ Rx antennas.

Regarding a transmission vector, up to $N_T$ symbols can be transmitted when the number of Tx antennas is $N_T$. The transmission vector can be expressed as follows.

MathFigure 2

$$s = [s_1, s_2, \ldots, s_{N_T}]^T \qquad [\text{Math.2}]$$

Each of Tx symbols $$s_1, s_2, \ldots, s_{N_T}$$

may have different Tx power. Herein, a superscript T denotes a transpose operator. By the transpose operator, a row vector is converted into a column vector, and a column vector is converted into a row vector. If each Tx power is expressed by $$P_1, P_2, \ldots, P_{N_T},$$

a transmission vector undergone Tx power regulation can be expressed as follows.

MathFigure 3

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad [\text{Math.3}]$$

In addition, $$\hat{s}$$

can be expressed as follows by using a diagonal matrix P.

MathFigure 4

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad [\text{Math. 4}]$$

Assume that $N_T$ Tx signals $$x_1, x_2, \ldots, x_{N_T}$$

are actually transmitted by applying a weight matrix W to the transmission vector $$\hat{s}$$

undergone Tx power regulation. The weight vector W properly distributes Tx symbols to respective antennas according to a transmission channel condition or the like.

The Tx signals $$x_1, x_2, \ldots, x_{N_T}$$

can be expressed as follows by using a Tx signal vector X.

MathFigure 5

$$x = \begin{bmatrix} x_1 \\ x_2 \\ \vdots \\ x_i \\ \vdots \\ x_{N_T} \end{bmatrix} \qquad [\text{Math. 5}]$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Herein, $w_{ij}$, denotes a weight between an $i^{th}$ Tx antenna and a $j^{th}$ symbol. W is a precoding matrix.

When the number of Rx antennas is $N_R$, an Rx signal of each antenna can be expressed in a vector form $$y_1, y_2, \ldots, y_{N_R}$$

as follows.

MathFigure 6

$$y = [y_1, y_2, \ldots, y_{N_R}]^T \qquad [\text{Math.6}]$$

FIG. 3 shows an exemplary structure of a radio frame in a 3GPP LTE.

Referring to FIG. 3, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame structure is shown for exemplary purposes only. Thus, the number of subframes included in the radio frame or the number of slots included in the subframe may change variously.

FIG. 4 shows an example of a resource grid for one UL slot in a 3GPP LTE.

Referring to FIG. 4, the UL slot includes a plurality of SC-FDMA symbols in a time domain, and includes NUL resource blocks (RBs) in a frequency domain. The SC-FDMA symbol is for expressing one symbol period. According to a system, the SC-FDMA symbol may be referred to as an OFDMA symbol or a symbol period. The RB is a resource allocation unit, and includes a plurality of subcarriers in the frequency domain. The number $N^{UL}$ of RBs included in the UL slot depends on a UL transmission bandwidth determined in a cell. $N^{UL}$ may be any one value in the range of 60 to 110 in the 3GPP LTE.

Each element on the resource grid is referred to as a resource element. The resource element on the resource grid can be identified by an index pair (k, l) within the slot.

Herein, k(k=0, . . . , $N^{UL} \times 12-1$) denotes a subcarrier index in the frequency domain, and l(l=0, . . . , 6) denotes an SC-FDMA symbol index in the time domain.

Although it is described herein that one RB includes 7*12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols is 7, and when using an extended CP, the number of SC-FDMA symbols is 6.

The resource grid for one UL slot in the 3GPP LTE of FIG. 4 can also apply to a resource grid for a DL slot. However, the DL slot includes a plurality of OFDM symbols in the time domain.

FIG. 5 shows an exemplary structure of a UL subframe in a 3GPP LTE.

Referring to FIG. 5, the UL subframe can be divided into a control region allocated with a physical uplink control channel (PUCCH) for carrying a UL control signal and a data region allocated with a physical uplink shared channel (PUSCH) for carrying user data. To maintain a single carrier property in the SC-FDMA, resource blocks (RBs) consecutive in a frequency domain are allocated to one UE.

The PUCCH for one UE is allocated in an RB pair. RBs belonging to the RB pair occupy different subcarriers in each of a 1st slot and a 2nd slot. This is called that the RB pair allocated to the PUCCH is frequency-hopped in a slot boundary. In FIG. 5, 'm' is a position index indicating a frequency domain position of an RB allocated to the PUCCH in a subframe.

The PUSCH is mapped to an uplink shared channel (UL-SCH) that is a transport channel. Examples of UL control signals transmitted over the PUCCH include a hybrid automatic repeat and request (HARM) acknowledgement (ACK)/non-acknowledgement (NACK) signal, a channel quality indicator (CQI) indicating a DL channel condition, a scheduling request (SR) that is a UL radio resource assignment request, etc. The PUCCH may support multiple formats. That is, UL control signals having different bits per subframe can be transmitted according to a modulation scheme. For example, when using binary phase keying (BPSK), 1-bit UL control information can be transmitted over the PUCCH, and when using quadrature phase shift keying (QPSK), 2-bit UL control information can be transmitted over the PUCCH.

Hereinafter, a method of transmitting a sounding reference signal (SRS) will be described. The SRS is a reference signal transmitted for UL scheduling by a UE to a BS. The BS estimates a UL channel by using the received SRS, and uses the estimated UL channel in the UL scheduling.

FIG. 6 shows an example of a subframe in which an SRS is transmitted.

Referring to FIG. 6, the SRS is transmitted over one SC-FDMA symbol in the subframe. An SC-FDMA symbol in a duration in which the SRS is transmitted is hereinafter referred to as a sounding symbol. Herein, the sounding symbol is a last SC-FDMA symbol among 14 SC-FDMA symbols constituting the subframe. However, this is for exemplary purposes only, and thus the position and number of sounding symbols in the subframe may change variously.

The SRS is transmitted not in a control region but in a data region. A UE may transmit the SRS throughout the entire frequency band (or subcarrier) of the data region or may transmit the SRS through a portion of the frequency band of the data region. When the UE transmits the SRS throughout the portion of the frequency band, each subframe for transmitting the SRS may be subject to frequency hopping with different frequencies. Further, the UE may transmit the SRS by using only even- (or odd-) indexed subcarriers. The UE may transmit the SRS either periodically or aperiodically.

The SRS may be transmitted in such a format that a specific cyclic shift value is applied to a base sequence. A PN sequence, a ZC sequence, or a CAZAC sequence generated by a computer may be used as the base sequence.

An SRS sequence $r^{SRS}(n)$ can be expressed as follows.

MathFigure 7

$$r^{SRS}(n) = r_{u,v}^{(\alpha)}(n) \quad \text{[Math.7]}$$

Herein, u denotes a PUCCH sequence-group number, and v denotes a base sequence number. A cyclic shift value α of the SRS can be expressed as follows.

MathFigure 8

$$\alpha = 2\pi \frac{n_{SRS}^{cs}}{8} \quad \text{[Math. 8]}$$

Herein, $n^{cs}_{SRS}$ is set by a higher layer for each UE. $n^{cs}_{SRS}$ is any one value selected from 0, 1, 2, 3, 4, 5, 6, and 7.

The SRS sequence $r^{SRS}(n)$ is multiplied by an amplitude scaling factor $\beta_{SRS}$ and is then transmitted at power $P_{SRS}$. The SRS sequence is mapped to a resource element (k, l) starting from $r^{SRS}(0)$ as follows.

MathFigure 9

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Math. 9]}$$

Herein, $k_0$ denotes a starting position of a frequency domain, and $M^{RS}_{sc,b}$ denotes an SRS sequence length defined as follows.

MathFigure 10

$$M_{sc,b}^{RS} = m_{SRS,b} N_{sc}^{RB}/2 \quad \text{[Math.10]}$$

Herein, $m_{SRS,b}$ can be expressed by Table 1 to Table 4 below with respect to each UL bandwidth $N^{UL}_{RB}$. $C_{SRS} \in \{0,1,2,3,4,5,6,7\}$ is an SRS bandwidth configuration (i.e., srs-BandwidthConfiguration) which is a cell specific parameter. $B_{SRS} \in \{0,1,2,3\}$ is an SRS bandwidth (i.e., srsBandwidth) which is a UE specific parameter. $C_{SRS} \in \{0,1,2,3,4,5,6,7\}$ and $B_{SRS} \in \{0,1,2,3\}$ are provided by the higher layer. In an uplink pilot timeslot (UpPTS), if the SRS bandwidth (i.e., srsBandwidth) which is the UE specific parameter is b=0, $m_{SRS,b}$ can be reconfigured as follows.

MathFigure 11

$$m_{SRS,0}^{max} = \max_{c \in C}\{m_{SRS,0}^c\} \leq N_{RB}^{UL} - 6N_{RA}) \quad \text{[Math.11]}$$

Herein, c denotes an SRS bandwidth configuration, and C is a set of SRS bandwidth configurations of Table 1 to Table 4 with respect to each UL bandwidth $N^{UL}_{RB}$. $N_{RA}$ is the number of physical random access channels (PRACH) with a format 4 in an addressed UpTPS. Reconfiguration of $m^{max}_{SRS,0}$ is instructed by the higher layer.

The starting position $k_0$ of the frequency domain is defined as follows.

MathFigure 12

$$k_0 = k'_0 + \sum_{b=0}^{B_{SRS}} 2M_{sc,b}^{RS} n_b \quad \text{[Math. 12]}$$

Herein, $k'_0$ for a normal UL subframe is defined as follows.

MathFigure 13

$$k'_0 = (\lfloor N_{RB}^{UL}/2 \rfloor - m_{SRS,0}/2) N_{SC}^{RB} + k_{TC} \quad \text{[Math 13]}$$

$k'_0$ for the UpPTS is defined as follows.

MathFigure 14

$$k'_0 = \begin{cases} (N_{RB}^{UL} - m_{SRS,0}^{max}) N_{sc}^{RB} + k_{TC} & \text{if } ((n_f \bmod 2) \times (2 - N_{SP}) + t_{RA}^1) \bmod 2 = 0 \\ k_{TC} & \text{otherwise} \end{cases} \quad \text{[Math. 14]}$$

Herein, $k_{TC} \in \{0,1\}$ is a transmission comb (i.e., transmissionComb) which is a parameter provided by the higher layer with respect to the UE, and $n_b$ is a frequency position index.

Frequency hopping of the SRS is configured by an SRS hopping bandwidth (i.e., SR-SHoppingBandwidth) $b_{hop} \in \{0, 1, 2, 3\}$ provided by the higher layer. If it is configured such that the frequency hopping of the SRS is not used (e.g., $b_{hop} \geq B_{SRS}$), the frequency position index $n_b$ is defined as follows.

MathFigure 15

$$n_b = \lfloor 4n_{RRC}/m_{SRS,b} \rfloor \bmod N_b \quad \text{[Math.15]}$$

Herein, $n_{RRC}$ is a parameter indicating a frequency domain position (i.e., frequency-DomainPosition), and is provided by the higher layer. If it is configured such that the frequency hopping of the SRS is used (e.g., $b_{hop} < B_{SRS}$), the frequency position index $n_b$ is defined as follows.

MathFigure 16

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Math. 16]}$$

Herein, $N_b$ is given in Table 1 to Table 4 with respect to each UL bandwidth $N_{RB}^{UL}$, and $F_b(n_{SRS})$ is defined as follows.

MathFigure 17

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases} \quad \text{[Math. 17]}$$

$N_{b_{hop}}$ is '1' irrespective of the value $N_b$ of Table 1 to Table 4, and $n_{SRS}$ for counting the number of a UE specific SRS transmission attempts is defined as follows.

MathFigure 18

$$n_{SRS} = \begin{cases} 2N_{SP}n_f + 2(N_{SP} - 1) \lfloor \dfrac{n_s}{10} \rfloor + \lfloor \dfrac{T_{offset}}{T_{offset\_max}} \rfloor, \\ \lfloor (n_f \times 10 + \lfloor n_s/2 \rfloor)/T_{SRS} \rfloor, \end{cases} \quad \text{[Math. 18]}$$

for 2 ms SRS periodicity of frame structure 2 otherwise

Herein, $T_{SRS}$ is an SRS transmission period of the UE, $T_{offset}$ is an SRS subframe offset, and $T_{offset\_max}$ is a maximum value of $T_{offset}$ for a specific configuration of the SRS subframe offset.

In all subframes other than a special subframe, the SRS can be transmitted in the last symbol of each subframe.

Table 1 shows $m_{SRS,b}$ and $N_b$ (b=0, 1, 2, 3) when $6 \in N_{RB}^{UL} \in 40$. Table 2 shows $m_{SRS,b}$ and $N_b$ (b=0, 1, 2, 3)

when $40 \in N^{UL}_{RB} \in 60$. Table 3 shows $m_{SRS,b}$ and $N_b$ (b=0, 1, 2, 3) when $60 \in N^{UL}_{RB} \in 80$. Table 4 shows $m_{SRS,b}$ and $N_b$ (b=0, 1, 2, 3) when $80 \in N^{UL}_{RB} \in 110$.

TABLE 1

| SRS Bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $M_{SRS,0}$ | $N_0$ | $M_{SRS,1}$ | $N_1$ | $M_{SRS,2}$ | $N_2$ | $M_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

| SRS Bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $M_{SRS,0}$ | $N_0$ | $M_{SRS,1}$ | $N_1$ | $M_{SRS,2}$ | $N_2$ | $M_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

| SRS Bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $M_{SRS,0}$ | $N_0$ | $M_{SRS,1}$ | $N_1$ | $M_{SRS,2}$ | $N_2$ | $M_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

| SRS Bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $M_{SRS,0}$ | $N_0$ | $M_{SRS,1}$ | $N_1$ | $M_{SRS,2}$ | $N_2$ | $M_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

A cell specific subframe configuration period $T_{SFC}$ and a cell specific subframe offset $\Delta SFC$ are proposed respectively for FDD and TDD in Table 5 and Table 6. $T_{SFC}$ can be shared by all UEs in a cell. The SRS subframe satisfies the following equation.

MathFigure 19

$$\lfloor n_s/2 \rfloor \bmod T_{SFC} \in \Delta_{SFC} \quad \text{[Math.19]}$$

In the TDD, the SRS is transmitted only in a configured UL subframe or UpPTS.

TABLE 5

| srsSubframe Configuration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 6

| srsSubframe Configuration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

UE transmit power $P_{SRS}$ for an SRS transmitted in a subframe i is defined as follows.

MathFigure 20

$$P_{SRS}(i) = \min\{P_{MAX}, P_{SRS\_OFFSET} + 10\log_{10}(M_{SRS}) + P_{O\_PUSCH}(j) + \alpha \cdot PL + f(i)\} \quad \text{[Math.20]}$$

Herein, a unit of $P_{SRS}(i)$ is [dBm]. When Ks=1.25, $P_{SRS\_OFFSET}$ is a 4-bit UE specific parameter semi-statically configured by the higher layer in a 1 dB unit in a region of [−3, 12] dB. When Ks=0, $P_{SRS\_OFFSET}$ is a 4-bit UE specific parameter semi-statically configured by the higher layer in a 1.5 dB unit in a region of [−10.5, 12] dB. $M_{SRS}$ is an SRS transmission bandwidth in the subframe i expressed by the number of resource blocks. f(i) is a current power control adjustment state for the PUSCH. $P_{O\_PUSCH}(j)$ is a parameter configured with a sum of a cell specific component and a UE specific component. The details thereof are defined in section 5.1.1 of the 3GPP TS 36.213 V8.3.0 (2008 May) "Technical Specification Group Radio Access Network; Evolved Universal Terrestrial Radio Access (E-UTRA); Physical layer procedures (Release 8)".

A cell specific SRS transmission bandwidth is configured by the higher layer. A cell specific SRS transmission subframe is configured by the higher layer. For a UE supporting an antenna selection scheme, an index $a(n_{SRS})$ of an antenna that transmits the SRS is defined as follows. This applies to a partial sounding bandwidth and a full sounding bandwidth, and it is configured in this case such that frequency hopping is not used (e.g., $b_{hop} \geq B_{SRS}$).

MathFigure 21

$$a(n_{SRS}) = n_{SRS} \bmod 2 \quad [\text{Math.21}]$$

If it is configured such that frequency hopping is used (e.g., $b_{hop} < B_{SRS}$), the index $a(n_{SRS})$ is defined as follows.

MathFigure 22

$$a(n_{SRS}) = \begin{cases} (n_{SRS} + \lfloor n_{SRS}/2 \rfloor + \beta \cdot \lfloor n_{SRS}/K \rfloor) \\ n_{SRS} \bmod 2 \end{cases} \quad [\text{Math. 22}]$$

mod 2 when K is even when K is odd
Herein, β is defined as follows.

$$\beta = \begin{cases} 1 & \text{where } K \bmod 4 = 0 \\ 0 & \text{otherwise} \end{cases}$$

K is defined as follows.

$$K = \prod_{b'=b_{hop}}^{B_{SRS}} N_{b'}$$

Herein, $N_{b_{hop}}=1$ irrespective of $N_b$. A case where single SRS transmission is configured for the UE is not included herein.

In the FDD, when one SC-FDMA symbol exists in an UpPTS, this can be used for SRS transmission. When two SC-FDMA symbols exist, both of the two SC-FDMA symbols can be used for SRS transmission, and both of the two SC-FDMA symbols can be allocated to the same UE.

Whenever an SRS and a PUCCH format 2/2a/2b are transmitted simultaneously in the same subframe, the UE does not transmit the SRS. If a parameter Simultaneous-AN-and-SRS is not True, the UE does not transmit the SRS whenever the SRS and the ACK/NACK and/or a positive SR are transmitted simultaneously in the same subframe. In the UpPTS, whenever SRS transmission overlaps with a PRACH region of a preamble format 4, the UE uses a current cell specific SRS bandwidth configuration and thus can avoid overlapping by decreasing an SRS transmission bandwidth to a maximum value given in Table 1 to Table 4.

The parameter Simultaneous-AN-and-SRS provided by the higher layer determines whether the UE is configured to support ACK/NACK and SRS transmission over a PUCCH in one subframe. If the UE is configured to support ACK/NACK and SRS transmission over the PUCCH in one subframe, the UE can transmit the ACK/NACK and the SR by using a shortened PUCCH format in a cell specific SRS subframe, and an ACK/NACK or SR symbol corresponding to an SRS position is punctured. The shortened PUCCH format can be used in a cell specific SRS subframe even if the UE cannot transmit the SRS in a corresponding subframe. Otherwise, the UE can use a normal PUCCH format 1/1a/1b for ACK/NACK and SR transmission.

A UE specific SRS configuration for an SRS periodicity $T_{SRS}$ and an SRS subframe offset $T_{offset}$ is defined in Table 7 and Table 8.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 8

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

Table 7 shows a UE specific SRS configuration in the FDD. Table 8 shows a UE specific SRS configuration in the TDD. The SRS periodicity $T_{SRS}$ indicating a period of SRS transmission is selected from a set {2, 5, 10, 20, 40, 80, 160, 320}ms or subframes. When the SRS periodicity $T_{SRS}$ is 2 ms in the TDD, two SRS resources are configured in a half-frame including UL subframes.

An example of SRS transmission for FDD and TDD ($T_{SRS}>2$) satisfies $(10 \cdot n_f + k_{SRS} - T_{offset}) \bmod T_{SRS} = 0$, where nf is a system frame number. In the FDD, $k_{SRS} = \{0, 1, \ldots, 9\}$ is a subframe index in a frame. In the TDD, $k_{SRS}$ is defined by Table 9.

TABLE 9

| | subframe index n | | | | | | | | | |
|---|---|---|---|---|---|---|---|---|---|---|
| | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

An example of SRS transmission for TDD($T_{SRS}=2$) is a subframe satisfying ($k_{SRS}-T_{offset}$)mod 5=0.

Error detection is provided in DCI transmission by using cyclic redundancy check (CRC). An entire PDCCH payload is used to measure a CRC parity bit. A bit of the PDCCH payload is expressed by $a_0, a_1, a_2, a_3, \ldots, a_{A-1}$. The parity bit is expressed by $p_0, p_1, p_2, p_3, \ldots, p_{L-1}$. 'A' is a size of the PDCCH payload. 'L' is the number of parity bits. Details of the parity bit may be found in section 5.1.1 of the 3GPP TS 36.212 "Technical Specification Group Radio Access Network; Evolved Universal Terrestrial Radio Access (E-UTRA); Multiplexing and channel coding (Release 8)". A sequence obtained after CRC attachment is expressed by $b_0, b_1, b_2, b_3, \ldots, b_{B-1}$, and B=A+L.

When UE transmit antenna selection is not configured or is not applicable, a CRC parity bit after attachment is scrambled with a corresponding RNTI $x_{rnti,0}, x_{rnti,1}, \ldots, x_{rnti,15}$. The $x_{rnti,0}$ corresponds to an MSB of the RNTI, and forms a sequence $c_0, c_1, c_2, c_3, \ldots, c_{B-1}$. A relationship between $c_k$ and $b_k$ is as follows.

MathFigure 23

$$c_k=b_k \text{ for } k=0,1,2,\ldots,A-1$$

$$c_k=(b_k+x_{rnti,k-A})\bmod 2 \text{ for } k=A,A+1,A+2,\ldots,A+15 \quad [\text{Math.23}]$$

When the UE transmit antenna selection is configured and is applicable, a DCI format 0 after attachment and a CRC parity bit of the PDCCH are scrambled with an antenna selection mask $x_{AS,0}, x_{AS,1}, \ldots, x_{AS,15}$ and a corresponding RNTI $x_{rnti,0}, x_{rnti,1}, \ldots, x_{rnti,15}$, thereby forming a sequence $c_0, c_1, c_2, c_3, \ldots, c_{B-1}$ indicated by Table 10 below.

TABLE 10

| UE transmit antenna selection | Antenna selection mask $<x_{AS,\ 0}, x_{AS,\ 1}, \ldots, x_{AS,\ 15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

A relationship between $c_k$ and $b_k$ is as follows.

MathFigure 24

$$c_k=b_k \text{ for } k=0,1,2,\ldots,A-1$$

$$c_k=(b_k+x_{rnti,k-A}+x_{AS,k-A})\bmod 2 \text{ for } k=A,A+1, A+2,\ldots,A+15 \quad [\text{Math.24}]$$

The UE transmit antenna selection is configured by the higher layer. If the transmit antenna selection cannot be performed by the UE or is not supported by the UE, the UE shall perform transmission through a UE port 0. If a closed-loop UE transmit antenna can be selected by the higher layer, the UE shall perform the transmit antenna selection as a response for a command received using a DCI format 0. If an open-loop UE transmit antenna can be selected by the higher layer, a transmit antenna selected by the UE is not specified.

Meanwhile, the BS performs signaling on a parameter to transmit an SRS to the UE. Examples of the parameter include information regarding a transmission time of the SRS, information regarding a frequency at which the SRS is transmitted, information regarding a cyclic shift value, etc. Specifically, the information regarding the transmission time of the SRS may be an SRS subframe, an SRS subframe offset, a transmission period, an SRS configuration index (i.e., srsConfigurationIndex), etc. The frequency information may be the number of resource blocks on which the SRS is transmitted, a starting position of physical resource block allocation, a subcarrier index, a transmission comb (i.e., transmissionComb), an SRS bandwidth, a frequency hopping bandwidth, etc. There is a RsUL-Config information element (IE) for specifying a parameter for SRS transmission, an UplinkPowerControlCommon IE and an UplinkPowerControlDedicated IE for specifying a parameter for uplink power control. An example of the SoundingRsUL-Config IE is described below.

```
SoundingRS-UL-ConfigCommon ::=     CHOICE {
    release                             NULL,
    setup                               SEQUENCE {
        srs-BandwidthConfig                 ENUMERATED {bw0, bw1, bw2, bw3, bw4, bw5, bw6, bw7},
        srs-SubframeConfig                  ENUMERATED {
                                                sc0, sc1, sc2, sc3, sc4, sc5, sc6, sc7,
                                                sc8, sc9, sc10, sc11, sc12, sc13, sc14, sc15},
        ackNackSRS-SimultaneousTransmission BOOLEAN,
        srs-MaxUpPts                        ENUMERATED {true}                        OPTIONAL    Cond TDD
```

```
        }
}
SoundingRS-UL-ConfigDedicated ::=       CHOICE{
    release                                 NULL,
    setup                                   SEQUENCE {
        srs-Bandwidth                           ENUMERATED {bw0, bw1, bw2, bw3},
        srs-HoppingBandwidth                    ENUMERATED {hbw0, hbw1, hbw2, hbw3},
        frecDomainPosition                      INTEGER (0..23),
        duration                                BOOLEAN,
        srs-ConfigIndex                         INTEGER (0..1023),
        transmissionComb                        INTEGER (0..1),
        cyclicShift                             ENUMERATED {cs0, cs1, cs2, cs3, cs4, cs5, cs6, cs7}
    }
}
```

Examples of the UplinkPowerControlCommon IE and the UplinkPowerControlDedicated IE are described below.

```
UplinkPowerControlCommon ::=            SEQUENCE {
    p0-NominalPUSCH                         INTEGER (-126..24),
    alpha                                   ENUMERATED {al0, al04, al05, al06, al07, al08, al09, al1},
    p0-NominalPUCCH                         INTEGER (-127..-96),
    deltaFList-PUCCH                        DeltaFList-PUCCH,
    deltaPreambleMsg3                       INTEGER (-1..6)
}
UplinkPowerControlDedicated ::=         SEQUENCE {
    p0-UE-PUSCH                             INTEGER (-8..7),
    deltaMCS-Enabled                        ENUMERATED {en0, en1},
    accumulationEnabled                     BOOLEAN,
    p0-UE-PUCCH                             INTEGER (-8..7),
    pSRS-Offset                             INTEGER (0..15),
    filterCoefficient                       FilterCoefficient        DEFAULT fc4
}
DeltaFList-PUCCH ::=                    SEQUENCE {
    deltaF-PUCCH-Format1                    ENUMERATED {deltaF-2, deltaF0, deltaF2},
    deltaF-PUCCH-Format1b                   ENUMERATED {deltaF1, deltaF3, deltaF5},
    deltaF-PUCCH-Format2                    ENUMERATED {deltaF-2, deltaF0, deltaF1, deltaF2},
    deltaF-PUCCH-Format2a                   ENUMERATED {deltaF-2, deltaF0, deltaF2},
    deltaF-PUCCH-Format2b                   ENUMERATED {deltaF-2, deltaF0, deltaF2}
}
```

Hereinafter, a method of transmitting an SRS by a UE through multiple antennas will be described.

FIG. 7 is a flowchart showing a method of transmitting an SRS by a UE through multiple antennas according to an embodiment of the present invention. It is assumed that the UE has N Tx antennas (where N>1).

Referring to FIG. 7, the UE generates an SRS sequence for each of Tx antennas #1, #2, . . . , #N of a multiple antenna system in a distinctive manner (step S100). The SRS sequence for each Tx antenna can be generated by using Equation 7. In this case, one UE may generate the SRS sequence by applying different cyclic shift (CS) values to the respective Tx antennas. For this, at least two CS values may be allocated to each UE. In Equation 8, a CS value α is determined according to $n^{cs}_{SRS}$, and when $^{cs}_{SRS}$=0, 1, 2, 3, 4, 5, 6, 7, the $n^{cs}_{SRS}$ values may be allocated either contiguously or within a specific interval to each UE. For one example, if $N^{cs}_{SRS}$ values are allocated to each UE, 1st to $N^{th}$ $n^{cs}_{SRS}$ values may be contiguously allocated to a 1st UE, and $(N+1)^{th}$ to $(2N)^{th}$ $n^{cs}_{SRS}$ values may be contiguously allocated to a 2nd UE. For another example, the $n^{cs}_{SRS}$ values of the 1st UE may be 0 and 1, and the $n^{cs}_{SRS}$ values of the 2nd UE may be 4 and 5. The two $n^{cs}_{SRS}$ values may be sequentially selected with a predetermined interval therebetween. Or, two values farthest away from each other (i.e., separated from each other by a maximum interval) may be chosen. For another example, the $n^{cs}_{SRS}$ values of the 1st UE may be 0 and 4, and $n^{cs}_{SRS}$ values of the 2nd UE may be 2 and 6. For another example, a plurality of $n^{cs}_{SRS}$ values may be randomly allocated to each UE.

The UE transmits the SRS to the BS through each Tx antenna (step S110). In this case, a different cyclic shift is applied to the SRS sequence transmitted through each Tx antenna, and thus each Tx antenna can transmit a different SRS sequence. Accordingly, each Tx antenna, i.e., antennas #1, #2, . . . , #N of the UE, can be identified by using a different CS value of the SRS.

FIG. 8 is a flowchart showing a method of transmitting an SRS by a UE through multiple antennas according to another embodiment of the present invention. It is assumed herein that the UE has N Tx antennas (where N>1).

Referring to FIG. 8, the UE generates an SRS sequence for each of a 1st antenna group including at least one Tx antenna and a 2nd antenna group including at least one Tx antenna (step S200). The SRS sequence for each antenna group can be generated by using Equation 7. In this case, one UE may generate the SRS sequence by applying different cyclic shift (CS) values to the respective Tx antennas.

The UE transmits the SRS to the BS through the 1st antenna group including at least one Tx antenna and the 2nd antenna group including at least one Tx antenna (step S210). In this case, if the 1st antenna group and/or the 2nd antenna group include a plurality of Tx antennas, each of the plurality of Tx antennas included in one antenna group may transmit an SRS sequence at a different time domain or frequency domain. For example, it is assumed that an antenna #1 and an antenna #2 are included in the 1st antenna group, and an antenna #3 and an antenna #4 are included in the 2nd antenna group. If the $n^{cs}_{SR}$ value assigned to the 1st antenna group is 0 and the $n^{cs}_{SR}$ value assigned to the second antenna group is 1, then the same SRS sequence is transmitted through the antenna #1 and the antenna #2, and the same SRS sequence is transmitted through the antenna #3 and the antenna #4. In this case, since a plurality of antennas included in one antenna group use the same SRS sequence, each antenna can transmit an SRS by using different time resources and/or frequency resources. Therefore, each antenna group is identified with a sequence resource used in the SRS, and each antenna included in the antenna group can be identified using a time/frequency resource on which the SRS is transmitted. Specifically, a transmission period of an SRS sequence transmitted through the antenna #1 may be set differently from a transmission period of an SRS sequence transmitted through the antenna #2. A frequency domain of the SRS sequence transmitted through the antenna #1 may be set differently from a frequency domain of the SRS sequence transmitted through the antenna #2. Herein, a transmission period of the SRS sequence can be identified according to srsConfigurationIndex($I_{srs}$) described in Table 7. The frequency domain of the SRS can be identified according to a transmission comb (i.e., transmissionComb). By reference, the transmissionComb indicates a plurality of subcarriers in which the SRS sequence is transmitted. For example, the transmissionComb may be 1-bit information, and the 1-bit information may indicate each of an odd-indexed subcarrier and an even-indexed subcarrier.

Unlike this, each antenna group may be identified with a time at which the SRS is transmitted, and each antenna included in the antenna group may be identified with a frequency resource and/or a sequence resource used for the SRS. Alternatively, each antenna group may be identified with a frequency at which the SRS is transmitted, and each antenna included in the antenna group may be identified with a time resource and/or a cyclic shift used for the SRS. That is, the SRS transmitted through each antenna is configured such that at least one of a sequence resource, a time resource, and a frequency resource can be identified.

FIG. 9 shows a method of transmitting an SRS through a plurality of antenna according to an embodiment of the present invention. It is assumed herein that a UE has N Tx antenna (where N>1).

Referring to FIG. 9, each antenna of the UE transmits the SRS at a different time. The SRS transmitted through each antenna may be an SRS sequence applied with the same CS value or an SRS sequence applied with a different CS value. On the basis of an antenna selection diversity scheme, the UE transmits the SRS through only one antenna among the N antennas every moment.

In this case, if total power assigned to the UE for SRS transmission is 1, each antenna can transmit the SRS by using the total power of 1. Accordingly, SRS coverage can be maintained to be the same as that of a UE which transmits an SRS by using a single antenna.

FIG. 10 shows a method of transmitting an SRS through a plurality of antenna according to another embodiment of the present invention. It is assumed herein that a UE has N Tx antenna (where N>1).

Referring to FIG. 10, the UE transmits the SRS at a different time for each antenna group. One antenna group includes at least one antenna, and transmits the SRS at a different time for each antenna group. For example, it is assumed that an antenna #1 and an antenna #2 belong to a 1st antenna group, and an antenna #(N−1) and an antenna #N belong to an $M^{th}$ antenna group. In this case, the antennas #1 and #2 belonging to the 1st antenna group simultaneously transmit the SRS, and the antennas #(N−1) and #N belonging to the $M^{th}$ antenna group simultaneously transmit the SRS. The antennas belonging to the 1st antenna group and the antennas belonging to the second antenna group transmit the SRS at different times. Herein, a plurality of antennas belonging to the same antenna group need to be identified. For this, each antenna may be applied with a different CS value or a different frequency domain. That is, SRS sequences transmitted by the antennas #1 and #2 may be SRS sequences applied with different CS values. In addition, SRS sequences transmitted by the antennas #(N−1) and #N may be SRS sequences applied with different CS values. Alternatively, the SRS sequences transmitted by the antennas #1 and #2 may be transmitted by applying different transmission combs. In addition, the SRS sequences transmitted by the antennas #(N−1) and #N may be transmitted by applying different transmission combs.

In this case, if total power assigned to the UE for SRS transmission is 1, each antenna group can transmit the SRS by using the total power of 1. However, power for SRS transmission may be divided for a plurality of antennas constituting one antenna group. For example, the 1st antenna group may transmit the SRS by entirely using the total power of 1, and each of the antennas #1 and #2 constituting the first antenna group may transmit the SRS at power of ½.

In this case, a plurality of antennas simultaneously transmitting the SRS are grouped into one antenna group, and a sequence resource or a frequency resource is distinctively used to identify each of the plurality of antennas included in each antenna group. Such a method can be extended variously. For example, a plurality of antennas applied with the same cyclic sequence may be grouped into one antenna group, and a time resource and a frequency resource may be distinctively used to identify each of the plurality of antennas included in each antenna group. Alternatively, a plurality of antennas using the same frequency resource may be grouped into one antenna group, and a sequence resource or a time resource may be distinctively used to identify each of the plurality of antennas included in each antenna group.

FIG. 11 shows a method of transmitting an SRS through a plurality of antenna according to another embodiment of the present invention. It is assumed herein that a UE has N Tx antenna (where N>1).

Referring to FIG. 11, the N antennas of the UE simultaneously transmit the SRS. In this case, each antenna needs to be identified. To identify each antenna, a different CS value may be applied to each antenna. Alternatively, each antenna may be identified by using a combination of a CS value and a transmission comb.

In this case, if total power assigned to the UE for SRS transmission is 1, each antenna can transmit the SRS at power of 1/N. Alternatively, the SRS may be transmitted in such a manner that power is unevenly assigned to each antenna under the condition that a sum of the power is 1. Alternatively, the SRS may be transmitted in such a manner that the N antennas may be grouped into M antenna groups and power is unevenly assigned to each antenna group under the condition that a sum of the power is 1. Herein, if each antenna group includes a plurality of antennas, each antenna may be assigned with the same power or may be unevenly assigned with power. In this case, a power offset assigned between antenna groups or a power offset assigned between antennas may be indicated by a BS or the UE, and a power offset $P_{SRS\_OFFSET}$ may be a UE specific parameter.

As shown in FIG. 9, FIG. 10, and FIG. 11, the UE transmits the SRS through the N antennas, and identifies each antenna by using a specific parameter. That is, each antenna may transmit the SRS at a different time domain or at a different cyclic shift. Alternatively, each antenna may be identified by a combination of a time domain, a cyclic shift, and a frequency domain.

FIG. 12 shows a method of mapping an SRS sequence to a frequency resource according to an embodiment of the present invention.

Referring to FIG. 12, a starting position of the SRS sequence is set differently for each antenna on a frequency bandwidth for SRS transmission. For example, N antennas (i.e., antennas #1, #2, . . . , #N) transmit respective SRS sequences in such a manner that the antenna #1, the antenna #2, and the antenna #N respectively map points P1, P2, and PN to starting positions of the SRS sequences. As such, when the SRS sequence is mapped to a frequency resource for each antenna, a cyclic mapping scheme can be used in which mapping is sequentially performed from a first position when mapping proceeds up to a last position of an assigned frequency bandwidth.

In this case, information regarding the method of mapping the SRS sequence to the frequency resource for each antenna can be provided by a higher layer. For example, srsBandwidth $B_{SRS} \in \{0,1,2,3\}$ and SRSHoppingBandwidth $b_{hop} \in \{0,1,2,3\}$ may be provided by the higher layer. In this case, how a UE transmitting an SRS through multiple antennas will apply frequency hopping to each antenna is a matter to be considered. When each antenna transmits the SRS by using a different frequency band, a single carrier property may be impaired. However, when using a transmission method irrespective of the single carrier property, the SRS can be transmitted by using a separate frequency band for each antenna. For example, when using SC-FDMA, it is preferable to transmit the SRS by using the same frequency band during a specific time period by applying the same frequency hopping to all antennas. Otherwise, when using OFDMA, the SRS may be transmitted by using a different frequency band by applying different frequency hopping to each antenna. By considering a characteristic of a MIMO system, different frequency hopping may be applied to each antenna, or a method of transmitting the SRS by applying the same frequency hopping may be taken into consideration.

When the UE supports antenna selection, if it is configured such that frequency hopping is not used (e.g., $b_{hop} \geq B_{SRS}$), an antenna index $a(n_{SRS})$ is defined as follows. It is assumed herein that the UE has N antennas (where N>1).

MathFigure 25

$$a(n_{SRS}) = n_{SRS} \bmod N \qquad \text{[Math.25]}$$

If it is configured such that frequency hopping is used (e.g., $b_{hop} < B_{SRS}$), the antenna index $a(n_{SRS})$ is defined as follows.

MathFigure 26

$$a(n_{SRS}) = \begin{cases} (n_{SRS} + \lfloor n_{SRS}/2 \rfloor + \beta \cdot \lfloor n_{SRS}/K \rfloor) \\ n_{SRS} \bmod N \end{cases} \qquad \text{[Math. 26]}$$

mod N when K is even when K is odd

Herein β is defined as follows.

$$\beta = \begin{cases} 1 & \text{where } K \bmod 4 = 0 \\ 0 & \text{otherwise} \end{cases}$$

K is defined as follows.

$$K = \prod_{b'=b_{hop}}^{B_{SRS}} N_{b'}$$

Herein, $N_{bhop}=1$ irrespective of $N_b$.

Meanwhile, Table 11 and Table 12 below define an antenna selection mask value for each antenna port when a UE transmits an SRS by using multiple antennas. Although it is shown herein that the UE has 4 antenna ports for example, this can also apply to a case where the UE has more than 4 antenna ports.

TABLE 11

| UE transmit antenna selection | Antenna selection mask $<X_{AS, 0}, X_{AS, 1}, \ldots, X_{AS, 15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |
| UE port 3 | <0, 0, 0, 0, 0, 0, 0, 0, 0, 0, 0, 0, 0, 0, 1, 1> |
| UE port 4 | <0, 0, 0, 0, 0, 0, 0, 0, 0, 0, 0, 0, 0, 0, 1, 0> |

TABLE 12

| UE transmit antenna selection | Antenna selection mask $<X_{AS, 0}, X_{AS, 1}, \ldots, X_{AS, 15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |
| UE port 3 | <0, 0, 0, 0, 0, 0, 0, 0, 0, 0, 0, 0, 0, 0, 1, 0> |
| UE port 4 | <0, 0, 0, 0, 0, 0, 0, 0, 0, 0, 0, 0, 0, 0, 1, 1> |

As described above, the UE may use a specific SRS parameter received from a BS in order to transmit the SRS through the multiple antennas. Examples of the SRS parameter include information regarding a transmission time of the SRS, information regarding a frequency at which the SRS is transmitted, information regarding a CS value, etc. Specifically, the information regarding the transmission time of the SRS may be an SRS subframe, an SRS subframe offset, a transmission period, an SRS configuration index (i.e., srsConfigurationIndex), etc. The frequency information may be the number of resource blocks on which the SRS is transmitted, a starting position of physical resource block allocation, a subcarrier index, a transmission comb (i.e., transmissionComb), an SRS bandwidth, a frequency hopping bandwidth, etc. Table 13 shows an example of parameters for identifying each antenna when the SRS is transmitted by using the multiple antennas.

TABLE 13 transmissionComb = INTEGER (0..1),
cyclicShift = ENUMERATED {cs0, cs1, cs2, cs3, cs4, cs5, cs6, cs7}
srs-ConfigurationIndex = INTEGER (0..1023), Hereinafter, a method of transmitting an SRS by a UE having multiple antennas according to an antenna selection method will be described.

A UE having N antennas (where N>1) may transmit an SRS by using a different transmission comb or the same transmission comb for each antenna. The N antennas may be divided into M antenna groups (where N>M), and the SRS may be transmitted by using the different transmission comb or the same transmission comb for each antenna group. When the different transmission comb is used for each antenna or each antenna group, the number of antennas using each transmission comb may be maintained to a constant number. Accordingly, SRS transmission can be prevented from being concentrated in a specific subcarrier.

The UE having N antennas (where N>1) may transmit the SRS by applying a different cyclic shift or the same cyclic shift to each antenna. The N antennas may be divided into M antenna groups (where N>M), and the SRS may be transmitted by applying the different cyclic shift or the same cyclic shift to each antenna group. When the different cyclic shift is applied to each antenna or each antenna group, CS values may be distributed with a constant interval to each antenna or each antenna group. Accordingly, orthogonality between respective antennas or between respective antenna groups can be maximized.

The UE having N antennas (where N>1) may transmit the SRS by using a different SRS-configuration index or the same SRS-configuration index for each antenna. When the different SRS-configuration index is used for each antenna, an antenna selection order needs to be determined in advance. As an example of determining the antenna selection order, the SRS may be transmitted in a subframe of an antenna to which a signal is first arrived. Accordingly, an antenna having a short period can transmit more SRSs. The N antennas may be divided into M antenna groups (where N>M), and the SRS may be transmitted by using a different SRS-configuration index for each antenna group. Accordingly, a multiplexing problem can be solved which occurs when a plurality of UEs transmit a plurality of SRSs by using multiple antennas. However, when a different SRS-configuration index is used for each antenna or each antenna group, a time delay for SRS transmission may be increased in proportion to the number of antennas, and as a result, channel quality measurement may be adversely affected. To correct this problem, an SRS transmission period may be set to be less than that used in the conventional method.

The UE having N antennas (where N>1) may transmit the SRS by using a combination of a transmission comb, a cyclic shift, and an SRS-configuration index. For one example, the SRS may be transmitted by using a different transmission comb for each antenna while applying the same CS value to the plurality of antennas. For another example, the SRS may be transmitted by applying a different CS value to each antenna while the same transmission comb is used for the plurality of antennas. Accordingly, orthogonality of sequences between respective antennas or between respective antenna groups can be ensured, and SRS transmission can be prevented from being concentrated in a specific subcarrier.

In order for the UE to transmit the SRS in uplink as described above, a BS has to signal configuration information to the UE. The configuration information for the SRS transmission (i.e., SoundingRsUL-Config) includes SoundingRsUL-ConfigCommon and SoundingRsUL-ConfigDedicated. The SoundingRsUL-ConfigCommon includes srsBandwidthConfiguration, SRSsubframeConfiguration, etc. The SoundingRsUL-ConfigDedicated includes srsBandwidth, srsHoppingBandwidth, frequencyDomain-Position, duration, srs-ConfigurationIndex, transmissionComb, cyclicshift, etc.

However, to cope with a case where a UE having multiple antennas transmits an SRS through each antenna, there is a need to additionally define the configuration information for SRS transmission. When the configuration information for SRS transmission is additionally defined for the UE having the multiple antennas, the followings have to be taken into consideration.

First, signaling may be performed so that a plurality of CS values are assigned to one UE. That is, a plurality of CS values among CS values cs0, cs1, cs2, cs3, cs4, cs5, cs6, and cs7 may be assigned to one UE. Therefore, one UE having a plurality of antennas can transmit an SRS by applying a different CS value to each antenna. Therefore, the UE may simultaneously transmit the SRS by using a plurality of antennas or may transmit the SRS at a different time. Alternatively, the UE may transmit the SRS to each antenna by using a combination of a cyclic shift and a time domain.

Next, signaling may be performed so that a plurality of transmission comb values are assigned to one UE. That is, one UE may use all of transmission comb values of 0 and 1. Accordingly, one UE having a plurality of antennas can transmit an SRS by combining a transmission comb and another parameter for each antenna.

Next, signaling may be performed so that a plurality of srsConfigurationIndex values are assigned to one UE. Accordingly, one UE having a plurality of antennas can transmit an SRS by varying a transmission period and/or a subframe offset for each antenna. By combining with another parameter, each antenna group may have the same transmission period.

Next, srsHoppingBandwidth, srsBandwidth, and frequencyDomainPosition may be changed to designate an additional frequency band and a frequency position for each of the plurality of antennas of one UE. This is effective particularly in an OFDMA system in which a single carrier property is not problematic. The parameters srsHoppingBandwidth, srsBandwidth, and frequencyDomainPosition may be changed independently or collectively.

Next, signaling for a power control parameter may be added for the UE having the plurality of antennas, or old signaling may be changed. Examples of old uplink power control parameters include UplinkpowerControlCommon used in common power control signaling and UplinkPowerControlDedicated used in dedicated power control signaling. As an example of changing the old signaling, an old signaling value may be used for an antenna port 0, and signaling for a newly defined parameter may be used for a newly added antenna port.

Signaling may be performed so that SRS transmission power is additionally configured for each of the plurality of antennas. In this case, when a power offset is configured for each antenna, a signaling bit for configuring the SRS transmission power can be decreased. In addition, when an antenna group including at least two antennas transmits the SRS simultaneously, signaling may be performed so that SRS transmission power is configured for the antenna group. In this case, SRS transmission power for each antenna belonging to the antenna group may be distributed in a predetermined ratio, or signaling may be performed on SRS transmission power separately for each antenna. Alternatively, there may be a configuration in which two or more antennas simultaneously transmit the SRS irrespective of the antenna group. In this case, signaling indicating the two or more antennas simultaneously transmitting the SRS may be defined, and signaling may be performed so that transmission power is distributed to the two or more antennas.

FIG. 13 is a block diagram showing an apparatus for wireless communication according to an embodiment of the present invention. The apparatus may be a part of a UE.

Referring to FIG. 13, an apparatus 100 for wireless communication includes an SRS generator 110, a processor 120, and a transceiver 130. The SRS generator 110 can generate an SRS. For SRS generation, the SRS generator 110 may include a subcarrier mapper which maps frequency-domain symbols to each subcarrier and an inverse fast Fourier transform (IFFT) unit which outputs a time-domain signal by performing IFFT on an input symbol. The processor 120 coupled to the SRS generator 110 transmits a 1st SRS through a 1st antenna and transmits a 2nd SRS through a 2nd antenna. Resources for transmitting the 1st SRS and the 2nd SRS are configured to be partially different from each other. The transceiver 130 is coupled to the processor 120, and transmits and receives a radio signal.

FIG. 14 is a block diagram showing an example of a BS and a UE. A UE 200 includes a radio frequency (RF) unit 210, a processor 220, and a memory 230. The processor 220 of the UE 200 transmits a 1st SRS through a 1st antenna, and transmits a 2nd SRS through a 2nd antenna. Resources for transmitting the 1st SRS and the 2nd SRS are configured to be partially different from each other. The aforementioned functions may be implemented in the processor 220. The memory 230 of the UE 200 is coupled to the processor 220, and stores an SRS sequence. The RF unit 210 of the UE 200 is coupled to the processor 220, and transmits and/or receives a radio signal.

A BS 300 includes an RF unit 310, a processor 320, and a memory 330. The processor 320 of the BS 300 transmits a specific parameter for SRS transmission to the UE, receives a plurality of SRSs transmitted based on the specific parameter from a plurality of antennas of the UE, and measures an uplink channel state by using the plurality of SRSs. The plurality of antennas are identified by the specific parameter. The aforementioned functions can be implemented in the processor 320. The memory 330 of the BS 300 is coupled to the processor 320, and stores a parameter for signaling to the UE. The RF unit 310 of the UE 300 is coupled to the processor 320, and transmits and/receives a radio signal.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting a sounding reference signal (SRS) using four antennas by a user equipment (UE) in a wireless communication system, the method comprising:
    receiving, by the UE, a cyclic shift parameter and a transmission comb parameter via a higher layer from a base station;
    determining, by the UE, four cyclic shift values for each of the four antennas according to the cyclic shift parameter, wherein the four cyclic shift values are separated from each other by a constant interval of 2 to be {0,2,4,6} or {1,3,5,7};
    determining, by the UE, transmission combs for each of the four antennas according to the transmission comb parameter;
    generating, by the UE, four SRS sequences, which correspond to the four antennas respectively, based on the four cyclic shift values, respectively;
    mapping, by the UE, the four SRS sequences to subcarriers based on the transmission combs; and
    transmitting, by the UE, the four SRS sequences via the four antennas, respectively, to the base station,
    wherein each of the transmission combs has a value of either 0 or 1, and
    wherein a number of antennas, among the four antennas, for which a transmission comb has a value of 0 and a number of antennas, among the four antennas, for which a transmission comb has a value of 1 is same.

2. The method of claim 1, wherein the cyclic shift parameter indicates a cyclic shift value for one antenna among the four antennas, and
    wherein cyclic shift values for the remaining three antennas are derived from the cyclic shift value for the one antenna.

3. The method of claim 1, wherein cyclic shift values for the antennas for which the transmission comb has a value of 0 are separated from each other by a maximum interval of 4, and
    wherein cyclic shift values for the antennas for which the transmission comb has a value of 1 are separated from each other by a maximum interval of 4.

4. The method of claim 1, further comprising:
    receiving a power control parameter from the base station; and
    setting a transmission power according to the power control parameter.

5. The method of claim 4, wherein the transmission power is equally divided for each of the four SRS sequences.

6. The method of claim 4, wherein the transmission power is separately set for each of the four SRS sequences.

7. The method of claim 6, wherein the power control parameter is received for each of the four SRS sequences, and
    wherein the power control parameter for each the four SRS sequences is indicated by an offset.

8. The method of claim 1, wherein the four SRS sequences are transmitted in different SRS periods from each other.

9. The method of claim 1, wherein two SRS sequences among the four SRS sequences are transmitted in a first SRS period, and
    wherein the remaining two SRS sequences among the four SRS sequences are transmitted in a second SRS period.

10. The method of claim 9, wherein a pair of antennas corresponding to the two SRS sequences transmitted in the first SRS period and a pair of antennas corresponding to the remaining two SRS sequences transmitted in the second SRS period are indicated by the base station.

11. A user equipment (UE) in a wireless communication system, the UE comprising:
a transceiver; and
a processor, coupled to the transceiver, that:
controls the transceiver to receive a cyclic shift parameter and a transmission comb parameter via a higher layer from a base station,
determines four cyclic shift values for each of four antennas according to the cyclic shift parameter, wherein the four cyclic shift values are separated from each other by a constant interval of 2 to be {0,2,4,6} or {1,3,5,7},
determines transmission combs for each of the four antennas according to the transmission comb parameter,
generates four sounding reference signal (SRS) sequences, which correspond to the four antennas respectively, based on the four cyclic shift values, respectively,
maps the four SRS sequences to subcarriers based on the transmission combs, and
controls the transceiver to transmit the four SRS sequences via the four antennas, respectively, to the base station,
wherein each of the transmission combs has a value of either 0 or 1, and
wherein a number of antennas, among the four antennas, for which a transmission comb has a value of 0 and a number of antennas, among the four antennas, for which a transmission comb has a value of 1 is same.

12. The UE of claim 11, wherein the cyclic shift parameter indicates a cyclic shift value for one antenna among the four antennas, and
wherein cyclic shift values for the remaining three antennas are derived from the cyclic shift value for the one antenna.

13. The UE of claim 11, wherein cyclic shift values for the antennas for which the transmission comb has a value of 0 are separated from each other by a maximum interval of 4, and
wherein cyclic shift values for the antennas for which the transmission comb has a value of 1 are separated from each other by a maximum interval of 4.

14. The UE of claim 11, wherein the processor further:
controls the transceiver to receive a power control parameter from the base station; and
sets a transmission power according to the power control parameter.

15. The UE of claim 14, wherein the transmission power is equally divided for each of the four SRS sequences.

16. The UE of claim 14, wherein the transmission power is separately set for each of the four SRS sequences.

17. The UE of claim 16, wherein the power control parameter is received for each of the four SRS sequences, and
wherein the power control parameter for each the four SRS sequences is indicated by an offset.

18. The UE of claim 11, wherein the four SRS sequences are transmitted in different SRS periods from each other.

19. The UE of claim 11, wherein two SRS sequences among the four SRS sequences are transmitted in a first SRS period, and
wherein the remaining two SRS sequences among the four SRS sequences are transmitted in a second SRS period.

20. The UE of claim 19, wherein a pair of antennas corresponding to the two SRS sequences transmitted in the first SRS period and a pair of antennas corresponding to the remaining two SRS sequences transmitted in the second SRS period are indicated by the base station.

* * * * *